United States Patent [19]
Rodari

[11] 4,456,870
[45] Jun. 26, 1984

[54] SPLIT WINDINGS MOTOR VEHICLE ALTERNATOR

[75] Inventor: Gianpiero Rodari, Bussero, Italy

[73] Assignee: Marelli Autronica S.p.A., Pavia, Italy

[21] Appl. No.: 401,058

[22] Filed: Jul. 23, 1982

[30] Foreign Application Priority Data

Jul. 23, 1981 [IT] Italy ............................ 68026 A/81

[51] Int. Cl.³ .......................... H02M 7/00; H02P 9/00
[52] U.S. Cl. ...................................... 322/29; 307/71; 322/90; 363/69
[58] Field of Search ............... 322/29, 89, 90; 363/69; 307/71, 16

[56] References Cited

U.S. PATENT DOCUMENTS

| | | | |
|---|---|---|---|
| 3,508,138 | 4/1970 | Schatz | 322/90 |
| 3,689,826 | 9/1972 | Cherry | 322/29 |
| 3,984,750 | 10/1976 | Pfeffer et al. | 322/90 X |
| 4,009,431 | 2/1977 | Johnson | 363/69 X |
| 4,339,704 | 7/1982 | McSparran et al. | 322/90 |

Primary Examiner—R. J. Hickey
Attorney, Agent, or Firm—Sughrue, Mion, Zinn, Macpeak and Seas

[57] ABSTRACT

The alternator comprises an induction winding subdivided into two half-windings (1, 2) each connected to the input terminals of a respective double half-wave rectifier circuit (3, 4). It further includes thyristors (14) each of which connects a terminal (A, B, C) of one half winding (1) to a non-homologous terminal (C',A',B') of the other half-winding (2) such that, when the thyristors (14) are triggered, the electromotive forces generated in the two said half-windings (1, 2) are added in phase with each other. When the speed of rotation of the engine of the motor vehicle is less than a predetermined value, the said thyristors (14) are triggered and hence the two half-windings (1, 2) are connected in series with each other. If the speed of rotation of the engine surpasses this predetermined value, the thyristors (14) are not triggered, and the two half-windings (1, 2) are connected in parallel with each other.

6 Claims, 3 Drawing Figures

SPLIT WINDINGS MOTOR VEHICLE ALTERNATOR

Background of the Invention

The present invention relates to alternators, and particularly to alternators for use as generators in vehicles.

It is known that the magnitude of the current which can be supplied by such an alternator when the speed of rotation of the engine, and hence of the rotor, is very high, is limited by the number of turns of the winding. In other words, at high speeds of rotation, in order for an alternator to be able to supply a very high current it is necessary for the induction winding of the alternator to be made with few turns. However, this solution has the disadvantage that, at low speed, the current supply is inadvantageous. In order to obtain sufficient current at low running speeds, it would in fact be necessary for the windings to have many turns.

In order to provide motor-vehicle alternators which are capable of supplying large currents at high running speeds, and at the same time, currents of a satisfactory magnitude even at low running speeds, it has been proposed to subdivide the induction winding into two half-windings intended for connection in series with each other at low running speeds and in parallel with each other at other speeds.

FIG. 1 of the appended drawings illustrates a conventional alternator of the type described above. In this Figure two three-phase, star-connected, induction half-windings are indicated by 1 and 2. The terminals of the half-winding 1 are connected to the input terminals of a first double half-wave rectifier circuit 3, for example of the Graetz bridge type. Similarly, the terminals of the half-winding 2 are connected to the input terminals of a second rectifier circuit 4 also of the Graetz bridge type. Two diodes 5, 6 are connected in series with the rectifier circuits 3 and 4 respectively. The circuit branch comprising the rectifier circuit 3 and the diode 5, is connected in parallel with the circuit branch comprising the diode 6 and the rectifier circuit 4, between two terminals 7, 8 across which the output voltage generated by the alternator and rectified by the circuits 3, 4 appears in use. By 9 is indicated a relay comprising a movable contact member 10, and an excitation coil 11 connected to a control circuit 12. The control circuit 12 includes sensors arranged to monitor the rate of rotation of the engine, and comparator means for supplying the coil 11 with an excitation current when the rate of rotation of the engine is less than a predetermined value. In this case, the energisation of the coil causes the closure of the movable contact 10 and consequently the connection of the anode of the diode 5 to the cathode of the diode 6. In this situation,the half-windings 1, 2 are connected in series with each other through the contact 10 and the diodes 5, 6 do not carry current. A direct current which may be of considerable magnitude passes through the contact 10.

If the rate of rotation of the engine rises above a predetermined value, the control circuit 12 causes the de-energisation of the relay 9 and consequently the opening of the contact 10. In this situation the half-windings 1, 2 are connected in parallel with each other.

FIG. 2 of the appended drawings indicates the level of maximum current I which can be supplied by an alternator as a function of the rate of rotation n (revolutions per unit time). In this Figure, curve A relates to an alternator the induction winding of which is formed with many turns, while curve B relates to an alternator the induction winding of which has a smaller number of turns. For the known alternator illustrated in FIG. 1, the characteristic curve is however, represented by the first section of curve A of FIG. 2 (for values of n less than $n_0$) and by the second section of the curve B (for values of n greater then $n_0$). The value $n_0$ represents the rate of rotation at which switching of the relay 9 occurs. When this relay is energised, the half-windings 1, 2 are connected in series and are equivalent to a winding formed with many turns. When the relay 9 is not energised, these half-windings are connected together in parallel and are equivalent to a single winding formed with a smaller number of turns.

The conventional alternator illustrated in FIG. 1 has several disadvantages. In the first place, the relay 9 is required to interrupt mechanically a direct current which may be rather high. This has disadvantages typical of electro-mechanical commutator devices such as, for example, the possible initiation of arcing or sticking of the contacts, a low commutation velocity etc. Such a relay cannot easily be replaced by a solid-state commutator device, for example a thyristor, since it has to cut off a direct current and not an alternating current.

In the second place, the diodes 5, 6, which are conductive when the half-windings 1, 2 are connected in parallel with each other,have to support the passage of direct currents of considerable magnitude, and have the disadvantage of a high dissipation and not insignificant cost.

SUMMARY OF THE INVENTION

The object of the present invention is to provide an alternator, particularly for motor vehicles, of the type specified above which allows the disadvantages of the alternators known until now to be avoided.

In order to achieve this object, the present invention provides an alternator comprising an induction winding subdivided into two half-windings each connected to the input terminals of a respective double half-wave rectifier circuit, and two-state commutator means connected to the rectifier circuit and arranged, in a first state, to connect the half-windings in series with each other, and, in a second state to connect the half-windings in parallel with each other, characterised in that the said commutator means comprise solid-state switch devices each of which connects a terminal of one half-winding to a respective terminal of the other half-winding, so that when the solid-state switch devices are in their first state, the electromotive forces generated in the two said half-windings add in phase with each other.

BRIEF DESCRIPTION OF THE DRAWINGS

Further characteristics and advantages of the present invention will become apparent from the detailed description which follows with reference to the appended drawings, provided purely by way of non-limiting example, in which.

DETAILED DESCRIPTION OF THE PREFERRED EMBODIMENTS

Figure 3:
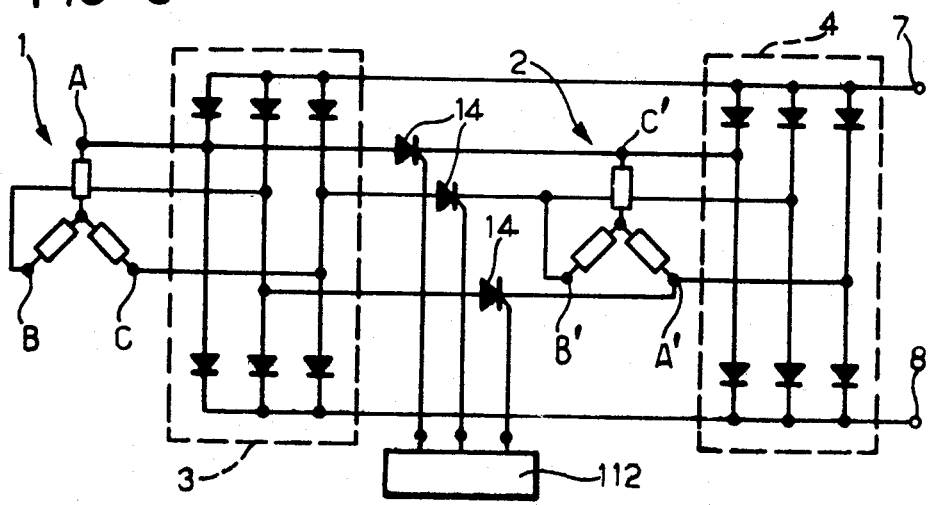
FIG. 3 is a circuit diagram of an alternator according to the invention.

In the embodiment illustrated in FIG. 3, the two induction half-windings 1, 2 of an alternator have respective terminals A, B, C, and A', B', C' connected to the input terminals of first and second Graetz bridge rectifier circuits 3, 4 respectively, which are connected in parallel with each other, between two output terminals 7, 8. Three thyristors shown as 14 each have their anodes connected to a terminal of the first half-winding 1 and their cathodes connected to a terminal of the other half-winding 2. The gate electrodes of the thyristors 14 are connected to a control circuit 112 of conventional type arranged to trigger the thyristors 14 when the rate of rotation of the engine of the motor vehicle is less than a predetermined value.

The half-windings 1, 2 are of three-phase type and, more particularly the half-winding 2 is in "contraphase" to the half-winding 1. In other words, the phases of the two half-windings have opposite cyclic senses.

In effecting the connection of the two half-windings 1, 2 by means of the thyristors 14, it is necessary to avoid homologous phases being connected together (otherwise the thyristor which connects them would never become conductive). In the example of FIG. 3, the connection has been formed as follows:

A, B, C→C', A', B',.

A further possible mode of connection would for example be as follows:

A, B, C,→B', C', A',.

The following examples of connections are however to be avoided:

A, B, C,→A', C', B',

A, B, C,→B', A', C', etc.

The alternator of FIG. 3 operates in the following manner.

Figure 2:
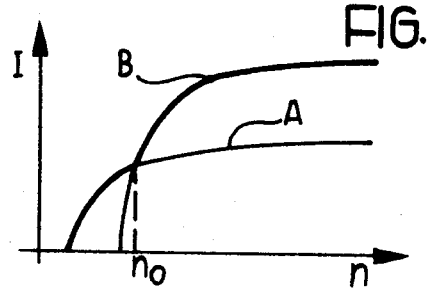

When the rate of rotation of the engine of the vehicle is less than the predetermined value, the control circuit 112 triggers the thyristors 14. In this situation the half-windings 1, 2 are connected in series, so that the electromotive forces generated therein add up in phase with each other. The half-windings 1, 2 connected in series with each other are equivalent to a single winding with a high number of turns. Hence, at low running speeds the supply of current by the alternator is essentially as shown by the first section of the curve A illustrated in FIG. 2.

When the rate of rotation of the engine of the vehicle exceeds the predetermined value, the control circuit 112 causes the thyristors 14 to be switched off. Consequently the half-windings 1, 2 of the alternator are now connected in parallel with each other, and are equivalent to a single winding with a smaller number of turns compared with the situation previously referred to. Under these conditions the supply of current by the alternator is essentially that shown by the second part of the characteristic curve B illustrated in FIG. 2.

Figure 1:
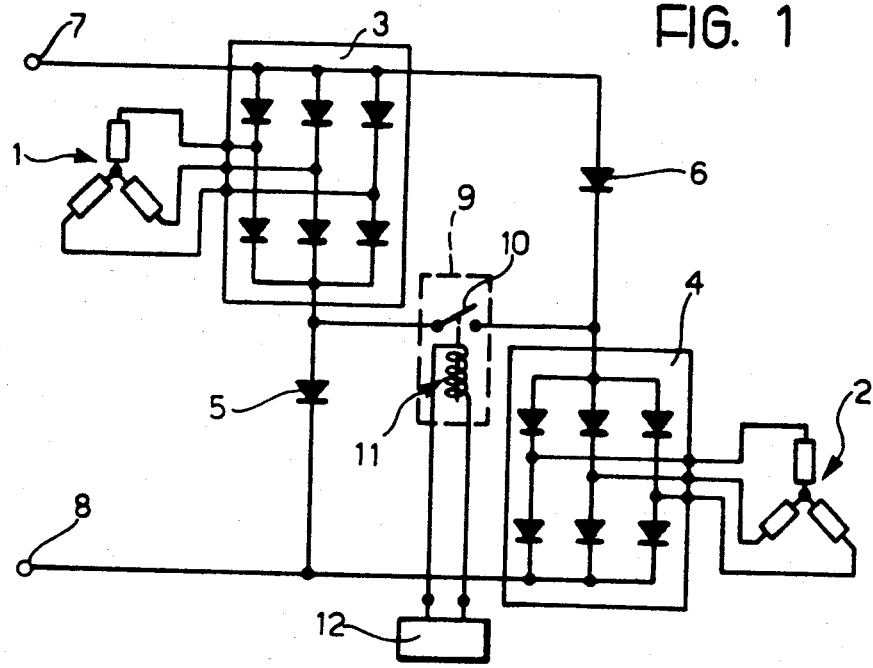
FIG. 1, already described,is a circuit diagram of an alternator according to the prior art, FIG. 2, already described, is a graph illustrating the maximum current flow I which can be supplied by an alternator as a function of the rate of rotation n which forms the abscissa.

The alternator according to the invention has various advantages. In the first place, all the disadvantages inherent in the electro-mechanical commutator devices used up till now in alternators of the conventional type are eliminated. In the second place, the blocking diodes 5, 6 of the implementation illustrated in FIG. 1, which, as indicated above, created considerable dissipation problems, are eliminated.

Naturally, the principal of the invention remaining the same, the embodiments and constructional details may be varied widely with respect to that described and illustrated purely by way of non-limiting example, without thereby departing from the scope of the present invention.

For example, the half-windings 1, 2 could be of the three phase delta-connected type instead of being star connected.

The thyristors could be replaced by power MOS commutators.

Furthermore, it is clear that what has been explained with reference to a three-phase alternator is also valid for single-phase alternators with simplifications self-evident to persons skilled in the art.

I claim:

1. An alternator arrangement, particularly for motor vehicles, comprising:
   (a) a 3-phase induction winding subdivided into two 3-phase half-windings (1,2),
   (b) two 3-phase full wave rectifier circuits (3,4) individually associated with said two half-windings,
   (c) means individually connecting output terminals of each half-winding to input terminals of an associated rectifier circuit,
   (d) means individually connecting output terminals of each rectifier circuit in parallel across a pair of alternator output terminals (7,8),
   (e) three two-state switch means (14) for individually connecting selected non-homologous output terminals of said two half-windings together such that when said switch means are open said half-windings are connected in parallel and when said switch means are closed said half-windings are connected in series with individual phase signals generated therein being in-phase and additive, and
   (f) a control circuit for controlling the joint opening and closing of said switch means.

2. An alternator arrangement according to claim 1, wherein said output terminals of said rectifier circuits are directly connected across said alternator output terminals.

3. An alternator arrangement according to claim 1, wherein:
   (a) the two half-windings are in phase opposition, and
   (b) non-homologous individual phases of the two half-windings are A-C', B-A' and C-B', wherein A, B, C and A', B', C' designate the individual phases of the two half-windings.

4. An alternator arrangement according to claim 1, wherein:
   (a) the two half-windings are in phase opposition, and
   (b) non-homologous individual phases of the two half-windings are A-B', B-C' and C-A', wherein A, B, C and A', B', C' designate the individual phases of the two half-windings.

5. An alternator arrangement according to claim 1 wherein said switch means comprise thyristors and said control circuit controls the triggering of said thyristors, each said thyristor having anode, cathode, and gate electrodes connected respectively to an output terminal of a phase of one half-winding, to a non-homologous output terminal of a phase of the other half-winding, and to said control circuit.

6. An alternator arrangement according to claim 5 wherein said control circuit includes means for sensing the speed of rotation of a motor-vehicle engine, said control circuit being arranged to trigger said thyristors when the speed of the engine is less than a predetermined value.

* * * * *